(12) United States Patent
Wu

(10) Patent No.: US 9,042,836 B2
(45) Date of Patent: May 26, 2015

(54) APPARATUSES AND METHODS FOR MEASUREMENT CONTROL

(75) Inventor: Chih-Hsiang Wu, Taoyuan County (TW)

(73) Assignee: HTC CORPORATION, Taoyuan (TW)

( * ) Notice: Subject to any disclaimer, the term of this patent is extended or adjusted under 35 U.S.C. 154(b) by 573 days.

(21) Appl. No.: 13/075,839

(22) Filed: Mar. 30, 2011

(65) Prior Publication Data

US 2011/0244804 A1 Oct. 6, 2011

Related U.S. Application Data

(60) Provisional application No. 61/319,279, filed on Mar. 31, 2010.

(51) Int. Cl.
 *H04B 17/00* (2006.01)
 *H04W 24/10* (2009.01)
(52) U.S. Cl.
 CPC ..................... *H04W 24/10* (2013.01)
(58) Field of Classification Search
 CPC ......... H04W 24/00; H04W 36/00; H04B 1/00
 USPC ............... 455/67.11, 67.1, 436, 552.1, 67.13, 455/63.3, 63.1
 See application file for complete search history.

(56) References Cited

U.S. PATENT DOCUMENTS

| | | | |
|---|---|---|---|
| 2010/0020852 A1* | 1/2010 | Erell et al. | 375/141 |
| 2010/0246463 A1* | 9/2010 | Papasakellariou et al. | 370/311 |
| 2010/0285806 A1 | 11/2010 | Iwamura | |
| 2010/0322185 A1* | 12/2010 | Park et al. | 370/331 |
| 2011/0244804 A1* | 10/2011 | Wu | 455/67.11 |

(Continued)

FOREIGN PATENT DOCUMENTS

| | | |
|---|---|---|
| JP | 2006-197559 A | 7/2006 |
| JP | 2007-295079 A | 11/2007 |
| JP | 2009-147910 A | 7/2009 |

(Continued)

OTHER PUBLICATIONS

3GPP TSG-RAN2 by LG Electronics, Nov. 9, 2009. Title: Measurement cofiguration structure for carrier aggregation. Jeju Korea.*

(Continued)

*Primary Examiner* — Wesley Kim
*Assistant Examiner* — Md Talukder
(74) *Attorney, Agent, or Firm* — Birch, Stewart, Kolasch & Birch, LLP

(57) ABSTRACT

A communications apparatus includes a wireless module and a controller module is provided. The wireless module transmits and receives radio frequency signals to and from a service network via at least a first and a second component carriers. The controller module receives a first measurement configuration corresponding to the first component carrier from the service network, receives a message indicating that the first component carrier is replaced by a third component carrier from the service network via the wireless module, receives a second measurement configuration corresponding to the third component carrier from the service network via the wireless module, keeps at least one of the first and second measurement configurations in response to receiving the message, and performs measurements according to the kept measurement configuration.

15 Claims, 5 Drawing Sheets

(56) References Cited

U.S. PATENT DOCUMENTS

2011/0244805 A1* 10/2011 Wu .......................... 455/67.11
2011/0317577 A1* 12/2011 Yamada et al. ............. 370/252

FOREIGN PATENT DOCUMENTS

| | | |
|---|---|---|
| JP | 2010-154399 A | 7/2010 |
| TW | 200952518 A1 | 12/2009 |
| WO | WO 2007/052769 A1 | 5/2007 |
| WO | WO 2007/125702 A1 | 11/2007 |
| WO | WO 2008/053302 A2 | 5/2008 |
| WO | WO 2008/097185 A2 | 8/2008 |
| WO | WO 2009/021572 A1 | 2/2009 |
| WO | WO 2009/082173 A3 | 7/2009 |
| WO | WO 2010/010516 A2 | 1/2010 |

OTHER PUBLICATIONS

Huawei: "Carrier aggregation in active mode"; 3GPP TSG-RAN WG2 Meeting #66; No. R2-093104, May 4-8, 2009, XP002641351, San Francisco, USA, pp. 1-4.

LG Electronics: "Measurement configuration structure for carrier aggregation"; 3GPP TSG-RAN2 Meeting #68; No. R2-097017, Nov. 9-14, 2009, XP002641352, Jeju, Korea, pp. 1-5.

* cited by examiner

APPARATUSES AND METHODS FOR MEASUREMENT CONTROL

CROSS REFERENCE TO RELATED APPLICATIONS

This application claims the benefit of U.S. Provisional Application No. 61/319,279, filed on Mar. 31, 2010, the entirety of which is incorporated by reference herein.

BACKGROUND OF THE INVENTION

1. Field of the Invention

The invention generally relates to apparatuses and methods for measurement control in a wireless communications system, and more particularly, to apparatuses and methods for managing measurement configurations of component carriers in a wireless communications system.

2. Description of the Related Art

Due to mobile communication technology advancements in recent years, various communication services, such as voice call services, data transfer services, and video call services, etc., may be provided to users regardless of their locations. Most mobile communications systems are multiple access systems in which access and wireless network resources are allocated to multiple users. The multiple access technologies employed by the mobile communications systems include the 1x Code Division Multiple Access 2000 (1x CDMA 2000) technology, the 1x Evolution-Data Optimized (1x EVDO) technology, the Orthogonal Frequency Division Multiplexing (OFDM) technology, and the Long Term Evolution (LTE) technology. Evolved from the LTE, the LTE Advanced is a major enhancement of the LTE standard. The LTE Advanced should be compatible with LTE equipment, and should share frequency bands with the LTE communications system. One of the important LTE Advanced benefits is its ability to take advantage of advanced topology networks, wherein optimized heterogeneous networks have a mix of macros with low power nodes such as picocells, temtocells and new relay nodes.

In addition, the LTE Advanced also introduces a multicarrier feature so as to be able to use ultra wide bandwidth, up to 100 MHz of a spectrum and support very high data rates. The multicarrier feature introduced in the LTE Advanced is supported by Carrier Aggregation (CA). In CA, two or more Component Carriers (CCs) are aggregated in order to provide wider transmission bandwidths up to 100 MHz. The CA can be applied to aggregate both contiguous and non-contiguous CCs. It is also possible to configure a User Equipment (UE) to aggregate a different number of CCs originating from the same evolved Node B (eNB) and of possibly different bandwidths in the uplink (UL) and the downlink (DL). The UE may simultaneously receive or transmit radio frequency (RF) signals via one or multiple CCs depending on its capabilities. A record of configured set of CCs aggregated for signal and data transmission may be maintained by both the UE and the eNB for keeping information regarding to the configured CCs for the UE.

However, the number of CCs in the configured set may be changed due to network conditions. For example, a new CC with good signal quality may be qualif?ied by the eNB and then added into the configured set of CCs. On the contrary, when signal quality of a CC in the configured set becomes poor, the eNB may decide to remove it from the configured set. Generally, each CC corresponds to at least one measurement configuration for configuring the measurement task corresponding to the CC. The measurement tasks corresponding to the CCs are performed by the UE so as to periodically or nonperiodically measure signal quality of the CC, for example by measuring Reference Signal Received Power (RSRP), Reference Signal Received Quality (RSRQ) or Received Signal Strength Indicator (RSSI) of the CC. When content of the configured set of CCs has been changed, how to manage the measurement configuration(s) corresponding to the added or removed CC(s) is a problem which eagerly needs to be solved.

BRIEF SUMMARY OF THE INVENTION

According to an embodiment of the invention, a communications apparatus comprises a wireless module and a controller module. The wireless module transmits and receives radio frequency signals to and from a service network via at least a first and a second component carriers. The first and second component carriers are configured by the service network and aggregated in a configured set of component carriers utilized for transmitting and receiving the radio frequency signals to and from the service network. The controller module receives a first measurement configuration corresponding to the first component carrier from the service network, receives a message indicating that the first component carrier is replaced by a third component carrier from the service network via the wireless module, receives a second measurement configuration corresponding to the third component carrier from the service network via the wireless module, keeps at least one of the first and second measurement configurations in response to receiving the message, and performs measurements according to the kept measurement configuration.

According to another embodiment of the invention, a communications apparatus for providing wireless communications services in a service network comprises a wireless module and a controller module. The wireless module transmits and receives radio frequency signals to and from a peer device via at least a first and a second component carriers. The first and second component carriers are aggregated in a configured set of component carriers utilized for transmitting and receiving the radio frequency signals to and from the peer device. The controller module transmits a first measurement configuration corresponding to the first component carrier to the peer device, transmits a message indicating that the first component carrier is replaced by a third component carrier to the peer device via the wireless module, transmits a second measurement configuration corresponding to the third component carrier to the peer device via the wireless module, and keeps at least one of the first and second measurement configurations in response to the first component carrier being replaced by the third component carrier.

According to yet another embodiment of the invention, a measurement control method used in a communications apparatus communicating with a service network via at least a first and a second component carriers which are aggregated in a configured set of component carriers comprises: receiving a first measurement configuration corresponding to the first component carrier from the service network; receiving a second measurement configuration corresponding to a third component carrier from the service network; replacing the first component carrier in the configured set of component carriers with the third component carrier; and keeping at least one of the first and second measurement configurations corresponding to the first and the third component carriers respectively.

According to still another embodiment of the invention, a communications apparatus comprises a wireless module and a controller module. The wireless module transmits and receives radio frequency signals to and from a service network via at least a first and a second component carriers. The first and second component carriers are configured by the service network and aggregated in a configured set of component carriers, and the first component carrier is a primary component carrier (PCC) in the configured set of component carriers. The controller module receives a first measurement configuration and a second measurement configuration respectively corresponding to the first and second component carrier from the service network, receives a message indicating that the PCC is changed to the second component carrier from the service network, and exchanges a measurement object related information element in the first measurement configuration with a measurement object related information element in the second measurement configuration in response to receiving the message.

Other aspects and features of the present invention will become apparent to those with ordinarily skill in the art upon review of the following descriptions of specific embodiments of apparatuses and methods for measurement control in a wireless communications system.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The 3GPP specifications are used to teach the spirit of the invention, and the invention is not limited thereto.

Figure 1:
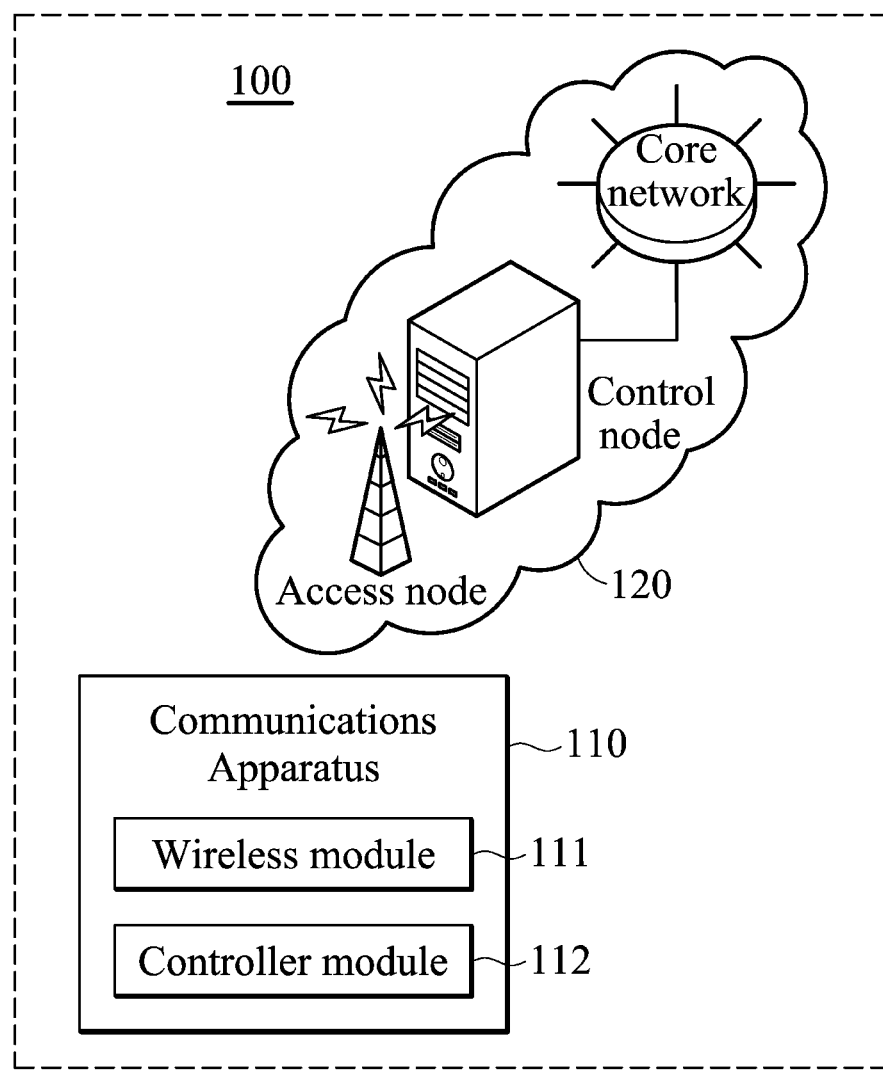
FIG. 1 is a block diagram illustrating a wireless communications system according to an embodiment of the invention.

FIG. 1 is a block diagram illustrating a wireless communications system according to an embodiment of the invention. In the wireless communications system 100, a communication apparatus 110, e.g. a User Equipment (UE), is wirelessly connected to a service network, such as the service network 120 shown in FIG. 1, for obtaining wireless communications services. The service network 120 may comprise an access node, such as an evolved Node B (eNB), interfacing between one or more communications apparatuses and the core network, for providing wireless communications services to the communications apparatus 110. The service network 120 may also comprise a control node for controlling the operation of the at least one access node. The operation of the service network 120 is in compliance with a communication protocol. In one embodiment, the service network 120 may be a Long Term Evolution (LIE) system or an LIE Advanced system.

The communications apparatus 110 may comprise at least a wireless module 111 for performing the functionality of wireless transmissions and receptions to and from the service network 120. To further clarify, the wireless module 111 may comprise a baseband unit (not shown) and a Radio Frequency (RF) unit (not shown). The baseband unit may contain multiple hardware devices to perform baseband signal processing, including Analog to Digital Conversion (ADC)/Digital to Analog Conversion (DAC), gain adjusting, modulation/demodulation, encoding/decoding, and so on. The RF unit may receive RF wireless signals, convert the received RF wireless signals to baseband signals, which are processed by the baseband unit, or receive baseband signals from the baseband unit and convert the received baseband signals to RF wireless signals, which are later transmitted. The RF unit may also contain multiple hardware devices to perform radio frequency conversion. For example, the RF unit may comprise a mixer to multiply the baseband signals with a carrier oscillated in the radio frequency of the wireless communications system, wherein the radio frequency may be 900 MHz, 1900 MHz, or 2100 MHz utilized in Universal Mobile Telecommunications System (UMTS) systems, or may be 900 MHz, 2100 MHz, or 2.6 GHz utilized in the LTE systems, or others depending on the RAT in use. Also, the communications apparatus 110 may comprise a controller module 112 for controlling the operation of the wireless module 111 and other functional components, such as a display unit and/or keypad serving as the MMI (man-machine interface), a storage unit storing data and program codes of applications or communication protocols, or others. In addition to the UMTS system and the LTE system, it is to be understood that the invention may be applied to any future UMTS-based technology.

Figure 2:
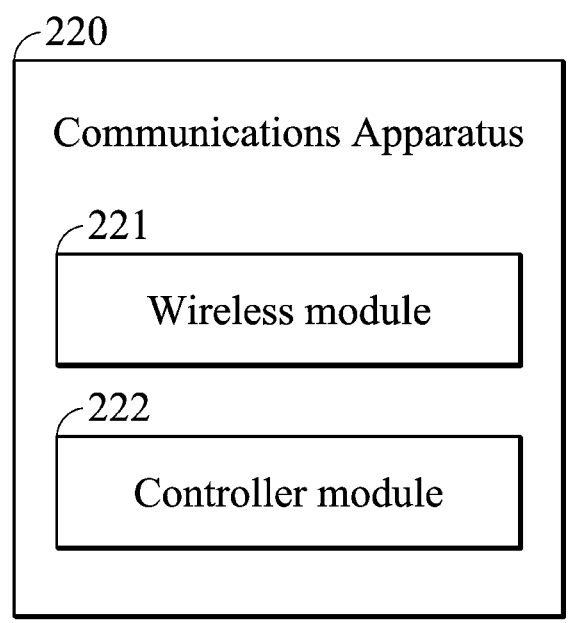
FIG. 2 shows a simplified block diagram of an access node in the service network according to an embodiment of the invention.

FIG. 2 shows a simplified block diagram of an access node as shown in FIG. 1 in the service network according to an embodiment of the invention. The access node may be, for example, an eNB, and may also be regarded as a communication apparatus for providing wireless communications services in the service network. The communications apparatus 220 may also comprise at least a wireless module 221 for performing the functionality of wireless transmissions and receptions between one or more peer devices, such as the communications apparatus 110 shown in FIG. 1, and the core network. To further clarify, the wireless module 221 may comprise a baseband unit (not shown) and a Radio Frequency (RF) unit (not shown). The baseband unit may contain multiple hardware devices to perform baseband signal processing, including Analog to Digital Conversion (ADC)/Digital to Analog Conversion (DAC), gain adjusting, modulation/demodulation, encoding/decoding, and so on. The RF unit may receive RF wireless signals, convert the received RF wireless signals to baseband signals, which are processed by the baseband unit, or receive baseband signals from the baseband unit and convert the received baseband signals to RF wireless signals, which are later transmitted. The RF unit may also contain multiple hardware devices to perform radio frequency conversion. For example, the RF unit may comprise a mixer to multiply the baseband signals with a carrier oscillated in the radio frequency of the wireless communications system, wherein the radio frequency may be 900 MHz, 1900 MHz, or 2100 MHz utilized in Universal Mobile Telecommunications System (UMTS) systems, or may be 900 MHz, 2100 MHz, or 2.6 GHz utilized in the LTE systems, or others depending on the RAT in use. Also, the communications apparatus 220 may comprise a controller module 222 for controlling the operation of the wireless module 221 and other functional components, such as a storage unit storing data and program codes of applications or communication protocols, or others. In addition to the UMTS system and the LTE system, it is to be understood that the invention may be applied to any future UMTS-based technology.

As previously described, it is possible to configure a User Equipment (UE) to aggregate a plurality of Component Carriers (CCs) to provided wider transmission bandwidths. When Carrier Aggregation (CA) is configured, the UE only has one Radio Resource Control (RRC) connection with the network. During the RRC connection establishment/re-establishment, one cell may provide the security input to the UE. After the RRC connection establishment/re-establishment procedure, the CC corresponding to that cell may be referred to as the Downlink Primary Component Carrier (DL PCC). There is always one DL PCC and one UL PCC configured per UE in a connected mode. Within the configured set of CCs, other CCs may be referred to as Secondary Component Carriers (SCCs). The RRC Re-establishment may be triggered when the DL PCC experiences Radio Link Failure (RLF).

The UE is responsible to measure signal qualities of one or more CCs in accordance with one or more measurement configuration(s) as provided by the EUTRAN, regardless of whether the corresponding CC is in the configured set or not, where the network side of the EUTRAN is composed by the eNBs. The UE is also responsible to report measurement information to the eNBs. The Measurement Configuration (MC) may comprise a plurality of parameters to describe information related to the object associated to the CC to be measured so as to facilitate the measurement task of the CC. Generally, one measurement configuration may correspond to one CC, but one CC may correspond to one or more measurement configurations. The EUTRAN may provide the measurement configuration applicable for a UE by means of dedicated signaling, i.e. using an RRC message (for example, an RRCConnectionReconfiguration message). According to an embodiment of the invention, the measurement configuration (MeasConfig) may include at least one of the following parameters:

1. Measurement objects (measObject): The objects on which the UE shall perform the measurements, for example, the frequency band of the corresponding CC.

2. Measurement object identity (measObjectId): An identity identifies the corresponding measurement object on which the UE shall perform the measurements.

3. Reporting configurations (reportConfig): A list of reporting configurations, where each reporting configuration may consist of the following:

Reporting criterion: The criterion that triggers the UE to send a measurement report. This may either be periodical or a single event description.

Reporting format: The quantities that the UE includes in the measurement report and associated information (e.g. number of cells to report).

4. Measurement identities (measId): A list of measurement identities where each measurement identity links one measurement object with one reporting configuration.

5. Quantity configurations (quantityConfig): The quantity configuration defines the measurement quantities and associated filtering used for all event evaluation and related reporting of that measurement type.

6. Measurement gaps (measGapConfig): Periods that the UE may use to perform measurements, i.e. no (UL, DL) transmissions are scheduled.

Figure 3:
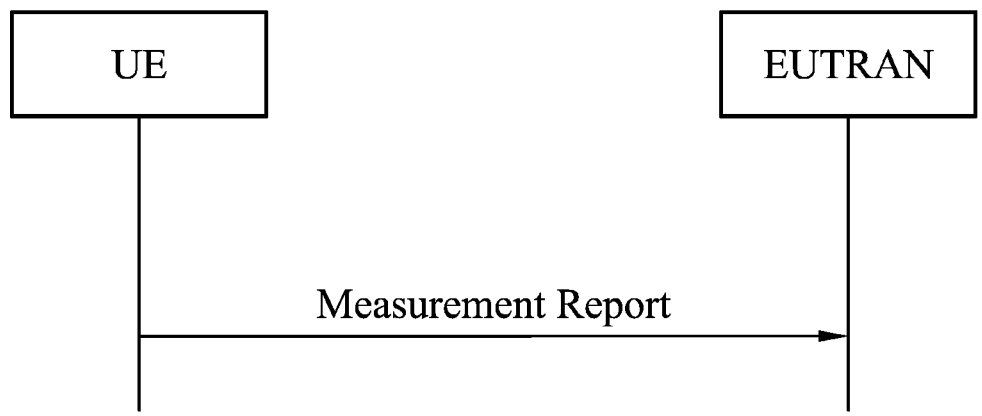
FIG. 3 shows a message flow of a measurement report transmitted from the UE to the EUTRAN according to an embodiment of the invention.

Generally, the EUTRAN only configures a single measurement object for a given frequency. Based on the measurement configuration(s) provided by the EUTRAN, the UE may perform the measurement task for the corresponding measurement object(s), and report the measurement result according to the reporting configuration(s). FIG. 3 shows a message flow of a measurement report transmitted from the UE to the EUTRAN according to an embodiment of the invention. The eNB in the EUTRAN may further configure one or more CCs to the UE according to the received measurement report. The addition and removal of a CC to or from the configured set of CCs are decided by the eNB. As previously described, the CC in the configured set may be added and removed due to the network condition. For example, a new CC with good signal quality may be qualified by the eNB and then added into the configured set of CCs. On the contrary, when signal quality of a CC in the configured set becomes poor, the eNB may decide to remove it from the configured set. The eNB may send an RRC message (for example, the RRCConnectionReconfiguration message) to request the UE to add a CC, remove a CC or replace a CC (i.e. to remove an original CC and add a new CC, simultaneously) configured to the UE in the configured set of CCs.

However, once a CC is added, or a CC is removed or replaced by another CC, the measurement configurations corresponding to the CCs become not clear. For example, suppose that a UE is configured with two DL CCs (the CC1 and the CC2) by an eNB. When the CC1 and/or the CC2 are/is replaced by a CC3 (i.e. the CC1 and/or the CC2 are/is removed and the CC3 is added, simultaneously), how the UE and the eNB handle the measurement configurations corresponding to the CC1, CC2 and the CC3 become random. For another example, suppose that a UE is configured with one DL CC (CC1) by an eNB. When the CC1 is replaced by the CC2 and the CC3 (i.e. CC1 is removed and the CC2 and the CC3 are added simultaneously), how the UE and the eNB handle the measurement configurations corresponding to the CC1, CC2 and the CC3 become random. In order to solve the above mentioned problems, in the following paragraphs, apparatuses and methods for managing measurement configurations of component carriers in a wireless communication system are provided.

According to a first aspect of the invention, for the communications apparatus 110 (e.g. the UE) as shown in FIG. 1, when an original CC in the configured set of CCs is replaced by a new CC, the UE may determine to keep at least one of the measurement configurations corresponding to the original CC and the new CC, and update some information elements in the corresponding measurement configurations. For example, suppose that the communications apparatus 110 is configured with a first CC (CC1) and a second CC (CC2) for transmitting and receiving RF signals to and from the service network (e.g. by the eNB in the EUTRAN), CC1 and CC2 may be aggregated in a configured set of CCs. When the communications apparatus 110 receives a message indicating that CC1 has to be replaced by a third component carrier (CC3) from the eNB, the communications apparatus 110 may keep the measurement configurations corresponding CC1 and CC3 after replacing CC1 in the configured set of CCs with CC3, and update some information elements in the corresponding measurement configurations.

According to an embodiment of the invention, the communications apparatus 110 may replace a measurement object related information element in the measurement configuration corresponding to the CC1 with a measurement object related information element in the measurement configuration corresponding to the CC3. The measurement object related information element may be the information element regarding a measurement object to be added or modified (MeasObjectToAddMod) and may be specified in the measurement configuration. Generally, the measurement configuration may be regarded as a data structure and comprise a plurality of information elements, for example, a measurement object addition or modify list (MeasObjectToAddModList), reference may be made to the 3GPP TS 36.331, Evolved Universal Terrestrial Radio Access (E-UTRA) Radio Resource Control (RRC) protocol specification). The measurement object addition or modify list (MeasObjectToAddModList) may link the information regarding one or more measurement objects to be added or modified (i.e. the MeasObjectToAddMod).

To be more specific, the communications apparatus 110 may keep one or more measurement configurations corresponding to the CC1 and replace the information element MeasObjectToAddMod of each measurement configuration corresponding to the CC1 with the information element MeasObjectToAddMod of the measurement configuration corresponding to the CC3. The information element MeasObjectToAddMod may also be regarded as a data structure and comprise at least the information regarding the measurement object and the measurement object identity (i.e. the measObjectId) to identify the corresponding measurement object on which the UE shall perform the measurements. The measurement identity (i.e. the measId) may link to one or more measurement object identities (i.e. the measObjectId) so as to specify the objects on which the UE shall perform the measurements in the measurement configuration.

Therefore, according to an embodiment of the invention, the communications apparatus 110 may replace the information element MeasObjectToAddMod of each measurement configuration corresponding to the CC1 with the information element MeasObjectToAddMod of the measurement configuration corresponding to the CC3 by linking the measId value of the measurement configuration corresponding to the CC1 to the measObjectId value of the measurement configuration corresponding to the CC3.

On the other hand, the communications apparatus 110 may also replace the information element MeasObjectToAddMod of each measurement configuration corresponding to the CC3 with the information element MeasObjectToAddMod of the measurement configuration corresponding to the CC1. Therefore, the measurement object related information elements of the measurement configurations corresponding to the CC1 and the CC3 may be swapped. For example, according to an embodiment of the invention, the communications apparatus 110 may link the measId value of the measurement configuration corresponding to the CC3 to the measObjectId value of the measurement configuration corresponding to the CC1.

According to an embodiment of the invention, when the CC1 is a primary component carrier (PCC) in the configured set of component carriers, the PCC is changed to the CC3 after the updating of the measurement configurations as previously described.

According to another embodiment of the invention, when the message further indicates that the CC2 has to be replaced by the CC3, the communications apparatus 110 may also keep and update at least one of the measurement configurations corresponding to the CC2 and the CC3, and performs measurements according to the kept and updated measurement configuration(s). For example, the communications apparatus 110 may keep the measurement configuration corresponding to the CC2 and replaces the MeasObjectToAddMod of the measurement configuration corresponding to the CC2 with the MeasObjectToAddMod of the measurement configuration corresponding to the CC3. To be more specific, the communications apparatus 110 may link the measId value of the measurement configuration corresponding to the CC2 to the measObjectId value of the measurement configuration corresponding to the CC3.

In the case when the number of added CCs is fewer than the number of removed CCs, for example, using the CC3 to replace the CC1 and the CC2, the communications apparatus 110 may determine to replace the measurement object related information element in the measurement configuration corresponding to the CC3 with the measurement object related information element in the measurement configuration corresponding to the CC1 or the CC2 according to some criteria. According to an embodiment of the invention, one of the criteria is to determine to replace the measurement object related information element in the measurement configuration corresponding to the CC3 with the measurement object related information element in the measurement configuration corresponding to the CC1 or the CC2 according to a command received from the service network.

The command may be an RRC message (e.g. the RRCConnectionReconfiguration message). The RRC message may explicitly or implicitly require the UE to replace the measurement object related information element in the measurement configuration corresponding to the CC3 with the measurement object related information element of which measurement configuration. For example, based on the RRC message, the UE may replace the MeasObjectToAddMod of the measurement configuration corresponding to the CC3 with the MeasObjectToAddMod of the measurement configuration corresponding to the CC1, because the CC1 is in a first position of a CC removal list in the RRC message. For another example, the UE may replace the MeasObjectToAddMod of the measurement configuration corresponding to the CC3 with the MeasObjectToAddMod of the measurement configuration corresponding to the CC2 because of an explicit indication carried in the RRC message.

According to another embodiment of the invention, another criteria is to determine which CC in the configured set of CCs is a primary component carrier (PCC), and replace the measurement object related information element in the measurement configuration corresponding to the CC3 with the measurement object related information element in the measurement configuration corresponding to the PCC. For example, when the CC1 is a PCC in the configured set of CCs, the communications apparatus 110 may replace the MeasObjectToAddMod of the measurement configuration corresponding to the CC3 with the MeasObjectToAddMod of the measurement configuration corresponding to the CC1.

As to the measurement configuration corresponding to the SCC, according to an embodiment of the invention, the communications apparatus 110 may further create and maintain a new measurement configuration, which is copied from the measurement configuration corresponding to the CC3, and replace a measurement object related information element in the new measurement configuration with a measurement object related information element in the measurement configuration corresponding to the SCC.

For the access node or the eNB for providing wireless communications services in the service network as shown in FIG. 1, a similar concept as previously described may be applied, so that the communications apparatus 110 and the network may have a same status of the measurement configurations corresponding to the CCs. For example, the eNB may replace the information element MeasObjectToAddMod of each measurement configuration corresponding to the CC1 with the information element MeasObjectToAddMod of the measurement configuration corresponding to the CC3 by linking the measId value of the measurement configuration corresponding to the CC1 to the measObjectId value of the measurement configuration corresponding to the CC3.

For another example, the eNB may also replace the information element MeasObjectToAddMod of each measurement configuration corresponding to the CC3 with the information element MeasObjectToAddMod of the measurement configuration corresponding to the CC1 by linking the measId value of the measurement configuration corresponding to the CC3 to the measObjectId value of the measurement configuration corresponding to the CC1.

In the case when the number of added CCs is fewer than the number of removed CCs, for example, using the CC3 to replace the CC1 and the CC2, the eNB may determine to replace the measurement object related information element in the measurement configuration corresponding to the CC3 with the measurement object related information element in the measurement configuration corresponding to the CC1 or the CC2 according to the information carried in the RRC message transmitted to the UE, or according to which one is the PCC as previously described. As to the measurement configuration corresponding to the SCC, according to an embodiment of the invention, the eNB may further create and maintain a new measurement configuration, which is copied from the measurement configuration corresponding to the CC3, and replaces a measurement object related information element in the new measurement configuration with a measurement object related information element in the measurement configuration corresponding to the SCC.

Figure 4:
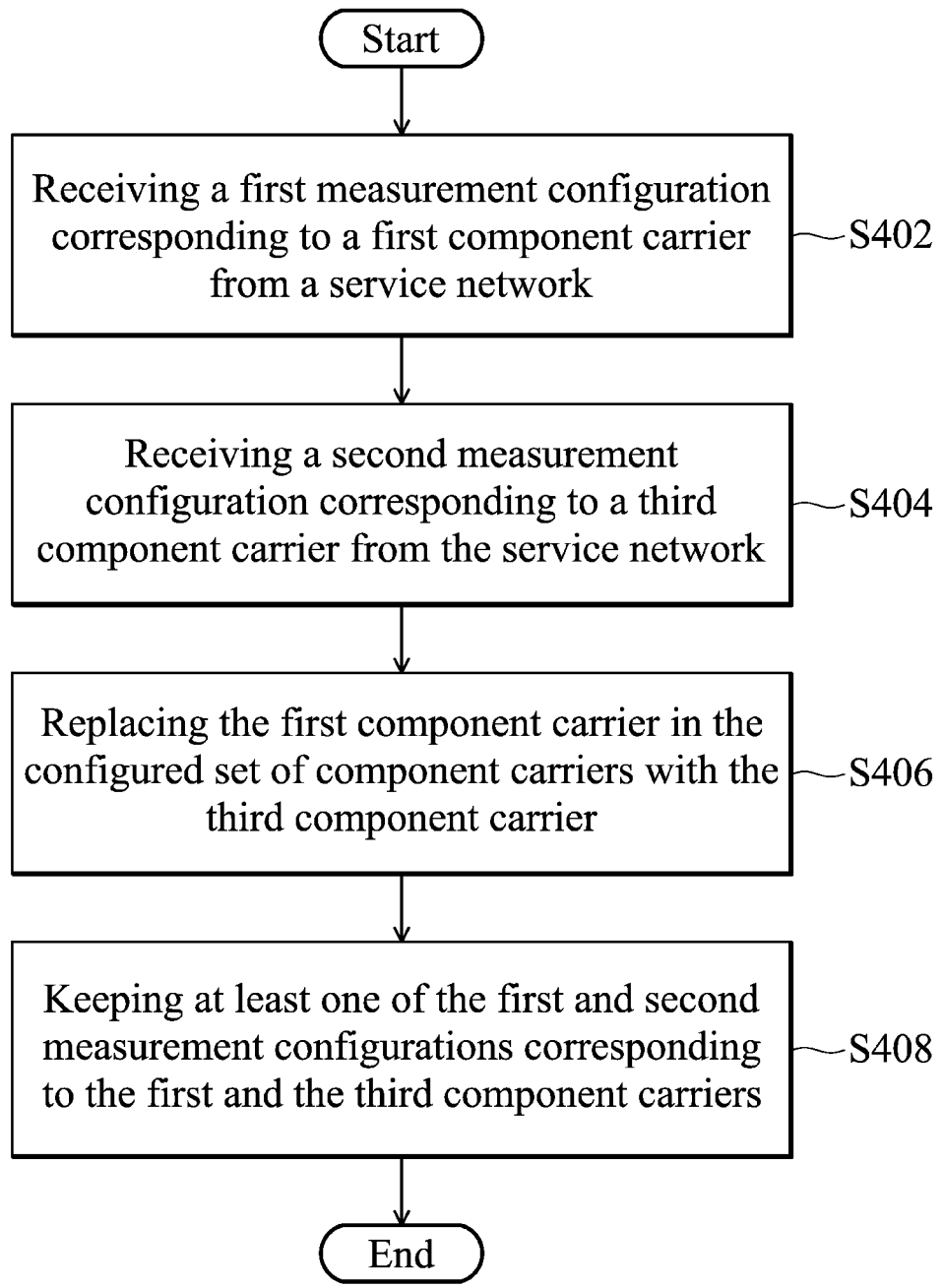
FIG. 4 is a flow chart illustrating a measurement control method according to a first aspect of the invention.

FIG. 4 is a flow chart illustrating a measurement control method according to a first aspect of the invention. To begin, in step S402, a first measurement configuration corresponding to a first component carrier is received from a service network. Next, in step S404, a second measurement configuration corresponding to a third component carrier is received from the service network. Next, in step S406, the first component carrier in the configured set of component carriers is replaced with the third component carrier. Finally, in step S408, at least one of the first and second measurement configurations corresponding to the first and the third component carriers is kept. The measurements of the component carriers may further be performed according to the kept measurement configuration(s).

According to a second aspect of the invention, for the communications apparatus 110 (e.g. the UE) as shown in FIG. 1, when the component carriers in the configured set of CCs are replaced by a plurality of new component carriers, the UE may update the measurement configurations corresponding to the component carriers in the configured set and the measurement configurations corresponding to the new component carriers according to a command received from the service network.

According to an embodiment of the invention, the communications apparatus 110 may update the measurement configurations corresponding to the component carriers in the configured set by replacing a measurement object related information element (for example, the MeasObjectToAddMod as previously described) in the measurement configurations corresponding to the component carriers in the configured set with a measurement object related information element in the measurement configurations corresponding to the new component carriers according to the command received from the service network.

The command may be a radio resource control (RRC) message (e.g. the RRCConnectionReconfiguration message). The RRC message may explicitly or implicitly command the UE on how to replace the MeasObjectToAddMod of the measurement configuration corresponding to each new CC with the MeasObjectToAddMod of measurement configuration corresponding to each CC in the configured set.

For example, suppose that the new CCs comprise the CC1, the CC2 and the CC3, and the configured set of CCs comprise the CC4 and the CC5. The communications apparatus 110 may replace the MeasObjectToAddMod of the measurement configuration corresponding to the CC1 with the MeasObjectToAddMod of the measurement configuration corresponding to the CC4, and replace the MeasObjectToAddMod of the measurement configuration corresponding to the CC2 with the MeasObjectToAddMod of the measurement configuration corresponding to the CC5 according to an order in a CC removal list and a CC addition list in the RRC message. The communications apparatus 110 may release or keep measurement configuration corresponding to the CC3. For another example, the communications apparatus 110 may replace the MeasObjectToAddMod of the measurement configuration corresponding to the CC1 with the MeasObjectToAddMod of the measurement configuration corresponding to the CC4, and replaces the MeasObjectToAddMod of the measurement configuration corresponding to the CC2 with the MeasObjectToAddMod of the measurement configuration corresponding to the CC5 because of an explicit indication information (e.g. a mapping table) in the RRC message. If the CC3 is not in the explicit indication information, the communications apparatus 110 may release measurement configuration corresponding to the CC3 or keep it for eNB reconfiguration.

For another example, suppose that the configured set of CCs comprise the CC1, the CC2 and the CC3, and the new CCs comprise the CC4 and the CC5. The communications apparatus 110 may replace the MeasObjectToAddMod of the measurement configuration corresponding to the CC1 with the MeasObjectToAddMod of the measurement configuration corresponding to the CC4, and replace the MeasObjectToAddMod of the measurement configuration corresponding to the CC2 with the MeasObjectToAddMod of the measurement configuration corresponding to the CC5 according to an order in a CC removal list and a CC addition list in the RRC message. The communications apparatus 110 may release or keep measurement configuration corresponding to the CC3. For another example, The communications apparatus 110 may replace the MeasObjectToAddMod of the measurement configuration corresponding to the CC1 with the MeasObjectToAddMod of the measurement configuration corresponding to the CC4, and replaces the MeasObjectToAddMod of the measurement configuration corresponding to the CC2 with the MeasObjectToAddMod of the measurement configuration corresponding to the CC5 because of an explicit indication information (e.g. mapping table) in the RRC message. If the CC3 is not in the explicit indication information, the communications apparatus 110 may release measurement configuration corresponding to the CC3 or keep it for eNB reconfiguration.

Figure 5:
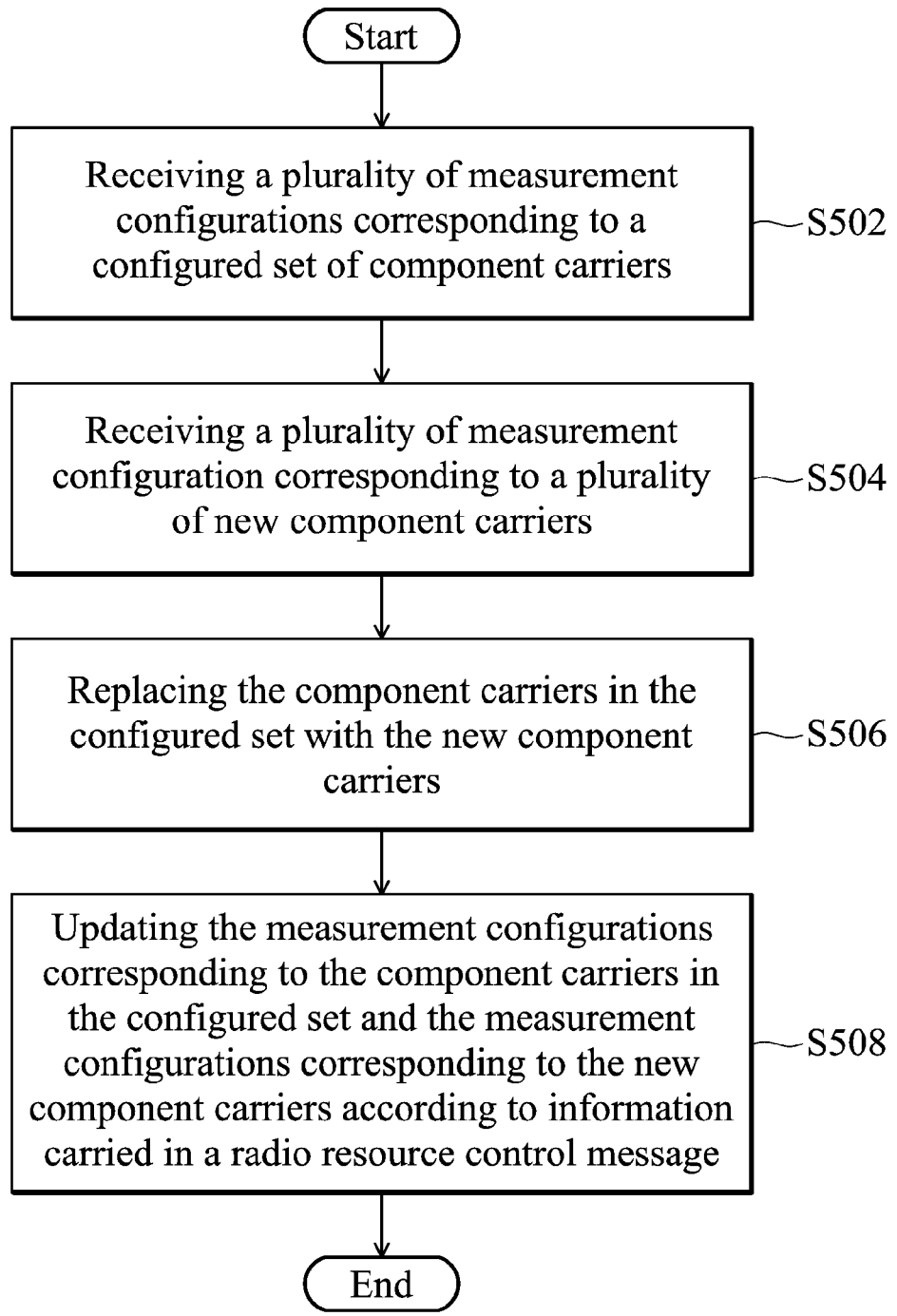
FIG. 5 is a flow chart illustrating a measurement control method according to a second aspect of the invention.

FIG. 5 is a flow chart illustrating a measurement control method according to a second aspect of the invention. To begin, in step S502, a plurality of measurement configurations corresponding to a configured set of component carriers are received. Next, in step S504, a plurality of measurement configurations corresponding to a plurality of new component carriers are received. Next, in step S506, the component carriers in the configured set are replaced with the new component carriers. Finally, in step S508, the measurement configurations corresponding to the component carriers in the configured set and the measurement configurations corresponding to the new component carriers are updated according to information carried in a radio resource control (RRC) message.

According to a third aspect of the invention, suppose that the communications apparatus 110 as shown in FIG. 1 is configured with a first CC (CC1) and a second CC (CC2) for transmitting and receiving RF signals to and from the service network (e.g. by the eNB in the EUTRAN), CC1 and CC2 may be aggregated in a configured set of CCs, and the CC1 is a PCC in the configured set of CCs. When the communications apparatus 110 receives a message indicating that the PCC is changed to the CC2, the communications apparatus 110 may exchange a measurement object related information element in the first measurement configuration corresponding to CC1 with a measurement object related information element in the second measurement configuration corresponding to CC2 in response to receiving the message. The method of exchanging the measurement object related information elements in the measurement configurations may refer to the previous paragraphs, and is omitted here for brevity.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A communications apparatus, comprising:
a wireless module, transmitting and receiving radio frequency signals to and from a service network via at least a first and a second component carriers, wherein the first and second component carriers are configured by the service network and aggregated in a configured set of component carriers utilized for transmitting and receiving the radio frequency signals to and from the service network; and
a controller module, receiving a first measurement configuration corresponding to the first component carrier from the service network, receiving a message indicating that the first component carrier is replaced by a third component carrier from the service network via the wireless module, receiving a second measurement configuration corresponding to the third component carrier from the service network via the wireless module, keeping at least one of the first and second measurement configurations in response to receiving the message, and performing measurements according to the kept measurement configuration,
wherein when the first measurement configuration corresponding to the first component carrier is kept, the controller module replaces a measurement object related information element in the first measurement configuration corresponding to the first component carrier with a measurement object related information element in the second measurement configuration corresponding to the third component carrier, and
wherein when the second measurement configuration corresponding to the third component carrier is kept, the controller module replaces a measurement object related information element in the second measurement configuration corresponding to the third component carrier with a measurement object related information element in the first measurement configuration corresponding to the first component carrier.

2. The communications apparatus of claim 1, wherein when the first component carrier is a primary component carrier (PCC) in the configured set of component carriers, the PCC is changed to the third component carrier.

3. The communications apparatus of claim 1, wherein the controller module further receives a third measurement configuration corresponding to the second component carrier from the service network, wherein when the message further indicates that the second component carrier is replaced by the third component carrier, the controller module keeps at least one of the first, second and third measurement configurations in response to receiving the message, and performs measurements according to the kept measurement configuration.

4. The communications apparatus of claim 3, wherein when the second measurement configuration corresponding to the third component carrier is kept, the controller module replaces a measurement object related information element in the second measurement configuration with a measurement object related information element in the first measurement configuration corresponding to the first component carrier or in the third measurement configuration corresponding to the second component carrier.

5. The communications apparatus of claim 3, wherein when the second measurement configuration corresponding to the third component carrier is kept and when the first component carrier is a primary component carrier (PCC) in the configured set of component carriers, the controller module replaces a measurement object related information element in the second measurement configuration with a measurement object related information element in the first measurement configuration corresponding to the first component carrier.

6. The communications apparatus of claim 3, wherein when the second measurement configuration corresponding to the third component carrier is kept, the controller module further creates and maintains a new measurement configuration copied from the second measurement configuration corresponding to the third component carrier, replaces a measurement object related information element in the new measurement configuration with a measurement object related information element in the first measurement configuration corresponding to the first component carrier, and replaces a measurement object related information element in the second measurement configuration with a measurement object related information element in the third measurement configuration corresponding to the second component carrier.

7. A communications apparatus for providing wireless communications services in a service network, comprising:
a wireless module, transmitting and receiving radio frequency signals to and from a peer device via at least a first and a second component carriers, wherein the first and second component carriers are aggregated in a configured set of component carriers utilized for transmitting and receiving the radio frequency signals to and from the peer device; and
a controller module, transmitting a first measurement configuration corresponding to the first component carrier to the peer device, transmitting a message indicating that the first component carrier is replaced by a third component carrier to the peer device via the wireless module, transmitting a second measurement configuration corresponding to the third component carrier to the peer device via the wireless module, and keeping at least one of the first and second measurement configurations in response to the first component carrier being replaced by the third component carrier, wherein when the first measurement configuration corresponding to the first component carrier is kept, the controller module replaces a measurement object related information element in the first measurement configuration corresponding to the first component carrier with a measurement object related information element in the second measurement configuration corresponding to the third component carrier, and wherein when the second measurement configuration corresponding to the third component carrier is kept, the controller module replaces a measurement object related information element in the second measurement configuration corresponding to the third component carrier with a measurement object related information element in the first measurement configuration corresponding to the first component carrier.

8. The communications apparatus of claim 7, wherein when the first component carrier is a primary component carrier (PCC) in the configured set of component carriers, the PCC is changed to the third component carrier.

9. The communications apparatus of claim 7, wherein the controller module further transmits a third measurement configuration corresponding to the second component carrier to the peer device, wherein when the message further indicates that the second component carrier is replaced by the third component carrier, the controller module keeps at least one of the first, second and third measurement configurations.

10. The communications apparatus of claim 9, wherein when the second measurement configuration corresponding to the third component carrier is kept, the controller module replaces a measurement object related information element in the second measurement configuration with a measurement object related information element in the first measurement configuration corresponding to the first component carrier or in the third measurement configuration corresponding to the second component carrier.

11. The communications apparatus of claim 9, wherein when the second measurement configuration corresponding to the third component carrier is kept and when the first component carrier is a primary component carrier (PCC) in the configured set of component carriers, the controller module replaces a measurement object related information element in the second measurement configuration corresponding to the third component carrier with a measurement object related information element in the first measurement configuration corresponding to the first component carrier.

12. The communications apparatus of claim 9, wherein when the second measurement configuration corresponding to the third component carrier is kept, the controller module further creates and maintains a new measurement configuration copied from the second measurement configuration corresponding to the third component carrier, replaces a measurement object related information element in the new measurement configuration with a measurement object related information element in the first measurement configuration corresponding to the first component carrier, and replaces a measurement object related information element in the second measurement configuration with a measurement object related information element in the third measurement configuration corresponding to the second component carrier.

13. A measurement control method used in a communications apparatus communicating with a service network via at least a first and a second component carriers which are aggregated in a configured set of component carriers, the method comprising:
receiving a first measurement configuration corresponding to the first component carrier from the service network;
receiving a second measurement configuration corresponding to a third component carrier from the service network;
replacing the first component carrier in the configured set of component carriers with the third component carrier; and
keeping at least one of the first and second measurement configurations corresponding to the first and the third component carriers respectively,
wherein when the first measurement configuration corresponding to the first component carrier is kept, a measurement object related information element in the first measurement configuration corresponding to the first component carrier is replaced with a measurement object related information element in the second measurement configuration corresponding to the third component carrier, and
wherein when the second measurement configuration corresponding to the third component carrier is kept, a measurement object related information element in the second measurement configuration corresponding to the third component carrier is replaced with a measurement object related information element in the first measurement configuration corresponding to the first component carrier.

14. The method of claim 13, wherein when the first component carrier is a primary component carrier (PCC) in the configured set of component carriers, the replacing step further comprises changing the PCC to the third component carrier.

15. A communications apparatus, comprising:
a wireless module, transmitting and receiving radio frequency signals to and from a service network via at least a first and a second component carriers, wherein the first and second component carriers are configured by the service network and aggregated in a configured set of component carriers, and the first component carrier is a primary component carrier (PCC) and the second component carrier is a secondary component carrier (SCC) in the configured set of component carriers; and
a controller module, receiving a first measurement configuration and a second measurement configuration respectively corresponding to the first and second component carrier from the service network, receiving a message indicating that the PCC is changed to the second component carrier from the service network, and interchanging a measurement object related information element in the first measurement configuration with a measurement object related information element in the second measurement configuration in response to receiving the message;
wherein interchanging a measurement object related information element in the first measurement configuration with a measurement object related information element in the second measurement configuration comprises:
the controller module replaces a measurement object related information element in the first measurement configuration corresponding to the first component carrier with a measurement object related information element in the second measurement configuration corresponding to the second component carrier, and
the controller module replaces a measurement object related information element in the second measurement configuration corresponding to the second component carrier with a measurement object related information element in the first measurement configuration corresponding to the first component carrier.

\* \* \* \* \*